(12) United States Patent
Clark et al.

(10) Patent No.: US 11,228,884 B2
(45) Date of Patent: Jan. 18, 2022

(54) VEHICLE-TO-VEHICLE FILE SHARING SYSTEM AND METHOD

(71) Applicant: Ford Global Technologies, LLC, Dearborn, MI (US)

(72) Inventors: Karl Nathan Clark, Belleville, MI (US); Gopichandra Surnilla, West Bloomfield, MI (US); Julius Thomas Crouch, II, Canton, MI (US); Vijayababu Jayaraman, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/249,483

(22) Filed: Jan. 16, 2019

(65) Prior Publication Data

US 2020/0228950 A1 Jul. 16, 2020

(51) Int. Cl.
| | | |
|---|---|---|
| *G06F 15/16* | (2006.01) | |
| *H04W 4/46* | (2018.01) | |
| *H04L 29/08* | (2006.01) | |
| *H04L 12/24* | (2006.01) | |
| *H04W 4/021* | (2018.01) | |
| *H04W 4/44* | (2018.01) | |

(52) U.S. Cl.
CPC ............ *H04W 4/46* (2018.02); *H04L 41/082* (2013.01); *H04L 67/06* (2013.01); *H04L 67/34* (2013.01); *H04W 4/021* (2013.01); *H04W 4/44* (2018.02)

(58) Field of Classification Search
CPC ...... H04W 4/46; H04W 4/021; H04L 41/082; H04L 67/06; H04L 67/34
USPC ................................ 709/221; 701/29.1, 29.3
See application file for complete search history.

(56) References Cited

U.S. PATENT DOCUMENTS

| | | | |
|---|---|---|---|
| 9,274,785 B2 | 3/2016 | Jung | |
| 9,282,495 B1* | 3/2016 | McKeeman | .......... H04W 24/02 |
| 2006/0146814 A1* | 7/2006 | Shah | ................... H04L 67/1097 |
| | | | 370/389 |
| 2014/0282467 A1* | 9/2014 | Mueller | .................... G06F 8/65 |
| | | | 717/170 |
| 2017/0032402 A1 | 2/2017 | Patsiokas et al. | |
| 2018/0075670 A1 | 3/2018 | Rajakondala et al. | |
| 2018/0210457 A1* | 7/2018 | Smartt | ................. G05D 1/0297 |
| 2019/0031203 A1* | 1/2019 | Fox | ....................... G06F 11/079 |

* cited by examiner

*Primary Examiner* — David R Lazaro
*Assistant Examiner* — Mariegeorges A Henry
(74) *Attorney, Agent, or Firm* — Michael Spenner; Brooks Kushman P.C.

(57) ABSTRACT

A vehicle includes a controller, programmed to, send a vehicle status report reflecting current status of the vehicle to a server; responsive to receiving a connection message from the server indicative of a predicted data transaction, wirelessly connect to a fleet vehicle using the connection message; and transmit a data block defined in the connection message to the fleet vehicle.

17 Claims, 5 Drawing Sheets

VEHICLE-TO-VEHICLE FILE SHARING SYSTEM AND METHOD

TECHNICAL FIELD

The present disclosure is generally related to a file sharing system for vehicles. More specifically, the present disclosure is related to a vehicle-to-vehicle (V2V) file sharing system.

BACKGROUND

Many vehicles are provided with telecommunication capabilities and are subscribed to wireless network carriers to download software such as vehicle firmware updates. The subscriptions to wireless network carriers usually come with a fee (e.g. $20 per Gigabyte from some carriers). The subscription fee has become a burden for some vehicle users to perform software updates, especially with update files increasing in size.

SUMMARY

According to one or more illustrative embodiment of the present disclosure, a vehicle includes a controller, programmed to, send a vehicle status report reflecting current status of the vehicle to a server; responsive to receiving a connection message from the server indicative of a predicted data transaction, wirelessly connect to a fleet vehicle using the connection message; and transmit a data block defined in the connection message to the fleet vehicle.

According to one or more illustrative embodiment of the present disclosure, a method for a vehicle includes responsive to receiving a request for vehicle status from a server, generating a vehicle status report using data collected from an in-vehicle network; sending the vehicle status report to a server; responsive to receiving a connection message from the server, connecting to a fleet vehicle using information included in the connection message, and receiving a data block defined in the connection message from the fleet vehicle.

According to one or more illustrative embodiment of the present disclosure, a server includes a controller, programmed to responsive to receiving vehicle status reports from a plurality of vehicles, analyze the vehicle status reports to detect a possible V2V connection opportunity; and responsive to detecting the possible V2V connection opportunity, generate connection messages including instructions to the plurality of vehicles to establish V2V connections.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

The present disclosure, among other things, proposes a vehicle data sharing system. More specifically, the present disclosure proposes a system allowing multiple vehicles to share files through V2V connections such as dedicated short range communications (DSRC).

Figure 1:
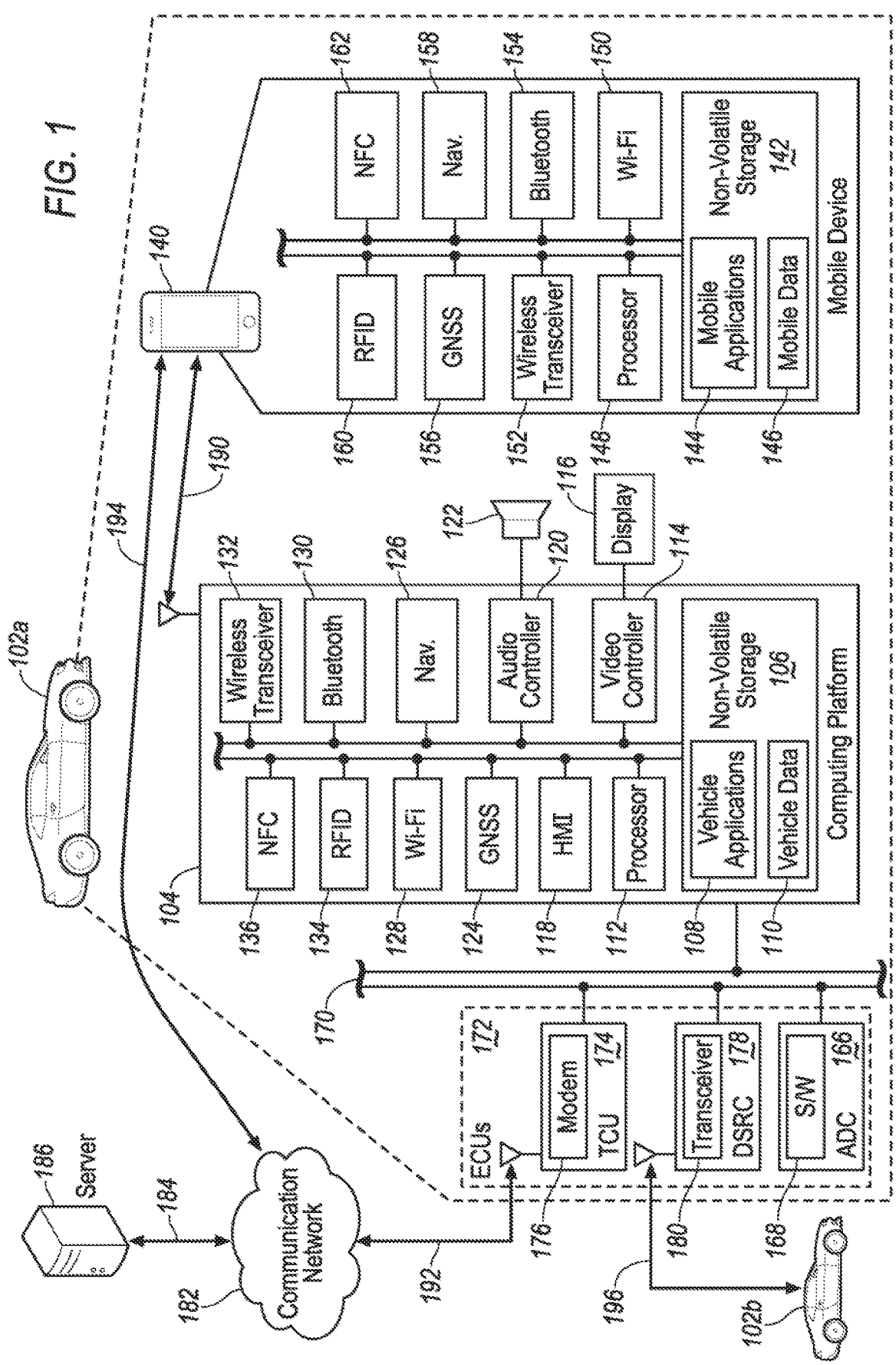
FIG. 1 illustrates an example block topology of a vehicle system of one embodiment of the present disclosure.

Referring to FIG. 1, an example block topology of a vehicle system 100 of one embodiment of the present disclosure is illustrated. A vehicle 102a may include various types of automobile, crossover utility vehicle (CUV), sport utility vehicle (SUV), truck, recreational vehicle (RV), boat, plane, or other mobile machine for transporting people or goods. In many cases, the vehicle 102a may be powered by an internal combustion engine. As another possibility, the vehicle 102a may be battery electric vehicle (BEV), a hybrid electric vehicle (HEV) powered by both an internal combustion engine and one or move electric motors, such as a series hybrid electric vehicle (SHEV), a parallel hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Mich. It should be noted that the illustrated system 100 is merely an example, and more, fewer, and/or differently located elements may be used.

As illustrated in FIG. 1, a computing platform 104 may include one or more processors 112 configured to perform instructions, commands, and other routines in support of the processes described herein. For instance, the computing platform 104 may be configured to execute instructions of vehicle applications 108 to provide features such as navigation, satellite radio, and wireless communications. Such instructions and other data may be maintained in a nonvolatile manner using a variety of types of computer-readable storage medium 106. The computer-readable medium 106 (also referred to as a processor-readable medium or storage) includes any non-transitory medium (e.g., tangible medium) that participates in providing instructions or other data that may be read by the processor 112 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 118 configured to provide for occupant interaction with the vehicle 102a As an example, the computing platform 104 may interface with one or more buttons (not shown) or other HMI controls configured to invoke functions on the computing platform 104 (e.g., steering wheel audio buttons, a push-to-talk button, instrument panel controls, etc.).

The computing platform 104 may also drive or otherwise communicate with one or more displays 116 configured to provide visual output to vehicle occupants by way of a video controller 114. In some cases, the display 116 may be a touch screen further configured to receive user touch input via the video controller 114, while in other cases the display 116 may be a display only, without touch input capabilities. The computing platform 104 may also drive or otherwise communicate with one or more speakers 122 configured to provide audio output to vehicle occupants by way of an audio controller 120.

The computing platform 104 may also be provided with navigation and route planning features through a navigation controller 126 configured to calculate navigation routes responsive to user input via e.g., the HMI controls 118, and output planned routes and navigation instructions via the speaker 122 and/or the display 116. Location data that is needed for navigation may be collected from a global navigation satellite system (GNSS) controller 124 configured to communicate with multiple satellites and calculate the location of the vehicle 102a The GNSS controller 124 may be configured to support various current and/or future global or regional location systems such as global positioning system (GPS), Galileo, Beidou, Global Navigation Satellite System (GLONASS) and the like. Map data used for route planning may be stored in the storage 106 as a part of the vehicle data 110. Navigation software may be stored in the storage 116 as one of the vehicle applications 108.

The computing platform 104 may be configured to wirelessly communicate with a mobile device 140 of the vehicle users/occupants via a wireless connection 190. The mobile device 140 may be any of various types of portable computing device, such as cellular phones, tablet computers, wearable devices, smart watches, laptop computers, portable music players, or other device capable of communication with the computing platform 104. The wireless transceiver 132 may be in communication with a Wi-Fi controller 128, a Bluetooth controller 130, a radio-frequency identification (RFID) controller 134, a near-field communication (NFC) controller 136, and other controllers such as a Zigbee transceiver, an IrDA transceiver (not shown), and configured to communicate with a compatible wireless transceiver 152 of the mobile device 140.

The mobile device 140 may be provided with a processor 148 configured to perform instructions, commands, and other routines in support of the processes such as navigation, telephone, wireless communication, and multi-media processing. For instance, the mobile device 140 may be provided with location and navigation functions via a navigation controller 158 and a GNSS controller 156. The mobile device 140 may be provided with a wireless transceiver 152 in communication with a Wi-Fi controller 150, a Bluetooth controller 154, a RFID controller 160, a NFC controller 162, and other controllers (not shown), configured to communicate with the wireless transceiver 132 of the computing platform 104.

The computing platform 104 may be further configured to communicate various electronic control units (ECUs) 172 via one or more in-vehicle network 170. The in-vehicle network 170 may include, but is not limited to, one or more of a controller area network (CAN), an Ethernet network, and a media-oriented system transport (MOST), as some examples.

Vehicle 102a may include multiple ECUs 172 configured to control and operate various functions of the vehicle 102a As a few non-limiting examples, the ECUs 172 may include a telematics control unit (TCU) configured to control telecommunication between vehicle 102a and a communication network 182 through a wireless connection 192 using a modem 176. The communication network 182 may be a cellular (e.g., 3G, 4G, and/or 5G) network enabling the communication between a remote server 186 and the computing platform 104. It is noted that, the remote server 186 is used as a general term throughout the present disclosure and may refer to any cloud-based services involving multiple servers, computers, devices and the like.

Additionally, the ECUs 172 may include a DSRC controller 178 having a transceiver 180 configured to communicate with compatible controllers of other vehicles (e.g., vehicle 102b) via a wireless connection 196. Additionally or alternatively, the vehicle 102a may be configured to communicate with the other vehicles via the wireless transceiver 132 using other types of technologies, such as Wi-Fi, Bluetooth, RFID, NFC and etc. The ECUs 172 may further include an autonomous driving controller (ADC) 166 configured to monitor and control the autonomous driving features of the vehicle 102a via software 168 stored in an internal storage.

The computing platform 104 may be configured to perform updates to the vehicle applications 108 stored in the storage 106 and ECU software stored locally in the ECUs 172 (e.g. the ADC software 168) by downloading update files from the server 186 (e.g. via the TCU 174), or installing the software via physical storage medium (e.g. universal serial bus (USB) storage, or digital optical disc storage). Alternatively, the computing platform 104 may be configured to share those update files among fleet vehicles (e.g. the second vehicle 102b) via a V2V connection such as the DSRC connection 196.

Figure 2:
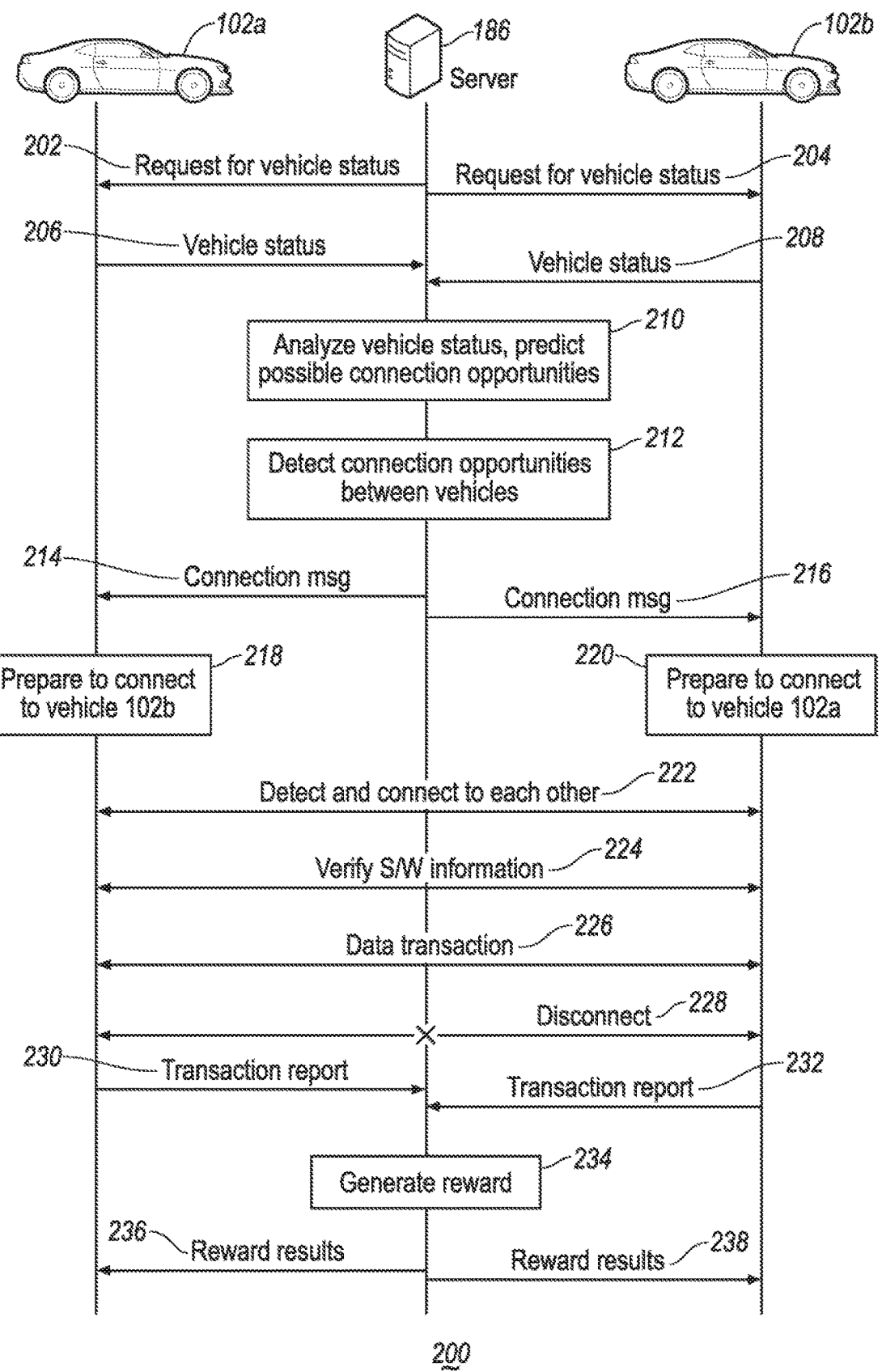
FIG. 2 illustrates an example data flow diagram of a vehicle system of one embodiment of the present disclosure.

Referring to FIG. 2, an example data flow diagram for a process 200 of one embodiment of the present disclosure is illustrated. In the present example, the vehicle 102a (hereinafter the first vehicle 102a) and a second vehicle 102b are among a fleet involving multiple vehicles provided with V2V data sharing features through various wireless connections e.g. via the DSRC transceiver 180 of the first vehicle 102a The first vehicle 102a and the second vehicle 102b are in communication with the fleet server 186 configured to coordinate and facilitate the V2V data sharing between the vehicles. At operations 202 and 204, the server 186 sends a request for vehicle status to each of the first vehicle 102a and the second vehicle 102b respectively. The vehicle status is a set of information that can be used by the server 186 to identify which vehicles can share data to which other vehicles, and when/where the predicted data sharing may occur. Responsive to receiving the request from the server 186, the computing platform 104 collects information from various pre-defined components of the first vehicle 102a and generate a vehicle status to send to the server 186 at operation 206. For instance, the collected vehicle information may include data from various pre-defined ECUs 172 indicating software versions, software versions of various vehicle applications 108, map version used by the navigation controller 126 stored in the storage 106 as a part of the vehicle data 110, location data from the GNSS controller 124, configuration and availability of wireless transceivers (e.g. the wireless transceiver 132, and/or the DSRC transceiver 180), battery charge level or the like. Similarly, the second vehicle 102b sends the vehicle status to the server 186 at operation 208.

Responsive to receiving vehicle status from multiple vehicles, at operation 210, the fleet server 186 analyzes the vehicle status and predicts possible connection opportunities. For instance, the server 186 may detect the first vehicle 102a has the latest version of a software (e.g. the map data) that the second vehicle 102b has not obtained yet. The server 186 may further detect the first vehicle 102a and the second vehicle 102b are located near each other within a pre-defined geo-fence/range specified by the server 186, making it is possible for the second vehicle 102 as a target vehicle to receive the latest version of software from the first vehicle 102a as a source vehicle through a V2V connection that both vehicles support. At operation 212, with pre-defined rules, the server 186 detects the V2V connection opportunity between the vehicles 102a and 102b to share the software data and in response, generate a connection message for each vehicle to instruct to connect and share data. The server 186 sends the respective connection messages to the first vehicle 102a and the second vehicle 102b at operations 214 and 216. The messages sent to the vehicles may include a source/target designation determined by the server 186, as well as identification of the vehicle to connection. For instance, the message sent to the first vehicle 102a may include a source designation for the specific software to be shared. Additionally, the message may further include identification of the second vehicle 102b such as an identification of the DSRC transceiver 178 to facilitate the V2V connection 196 which may be particularly helpful when multiple vehicles supporting V2V connections are within the proximity. To enhance the connection security, the connection message may further include secured connection information such as a security token or a password allowing the vehicles to connect in a secured way. In case that one or more vehicles are parked, the message may further include a wakeup command to facilitate the V2V connection 196.

Responsive to receiving the connection message, both the first vehicle 102a and the second vehicle 102b prepare to establish the V2V connection 196 by activating the wireless transceivers such as the DSRC transceivers 168 and search for the vehicle designated by the connection message. Responsive to detecting the designated vehicle within a connection range supported by the wireless transceivers, the first vehicle 102a and the second vehicle 102b establishes the wireless connection 196 via DSRC at operation 222. At operation 224, the vehicles 102a and 102b verify information received from the server 186 is accurate. For instance, the vehicles 102a and 102b may verify the software versions of each other matches the information contained in the connection message received at operations 214 and 216 so that the V2V data transaction is appropriate. Responsive to successfully verifying the information, at operation 226 the data transaction between the first vehicle 102a as a source vehicle and the second vehicle 102b as a target vehicle starts. The computing platform 104 may divide the software into multiple blocks and send the data in a block-by-block basis. The division of software into blocks may be uniformly specified by the server 186 for multiple vehicles among the fleet. In case that the second vehicle 102b is unable to receive all blocks from the first vehicle 102, the rest of data blocks may still be obtained elsewhere at a later time.

At operation 228, the first vehicle 102a disconnects from the second vehicle 102b. The disconnection may be caused by various reasons such as the distance between the two vehicles extends beyond the geo-fence defined by the transmission range, or the data transaction has completed. Responsive to detecting the disconnection, at operation 230 the computing platform 104 of the first vehicle 102a generates a transaction report and sends to the server 230. The transaction report may include information summarizing the data transaction including the identification of blocks transferred/received, the size of data transferred/received, current status/version of the software or the like. The second vehicle 102b generates and sends the same type of transaction report to the server 186 at operation 232. Responsive to receiving the transaction reports from the fleet vehicles, the server 186 generates incentive rewards using predefined rules. The incentive rewards may be used to encourage vehicle users to use the V2V data sharing feature, especially for the source vehicle. For instance, the incentive result may include a dealer service credit, e.g. $1 for every 100 Megabyte data transferred as the source vehicle, and/or $0.50 for every 100 Megabyte data received as a target vehicle. The incentive result may be stored in the server 186 for future use. Alternatively, if the incentive result involves a third-party, the server 186 may be configured to send the incentive result to the third-party server. At operation 236 and 238, the server 186 sends the incentive results to the first vehicle 102a and the second vehicle 102b for outputting to the vehicle user to encourage the users to continue to use the V2V data sharing features.

The operations of the process 200 may be applied to various situations. For instance, with reference to FIG. 3, an example diagram 300 of the V2V connection of one embodiment of the present disclosure is illustrated. In the present example, both the first vehicle 102a and the second vehicle 102b are travelling in a local area. The first vehicle 102a may approach an intersection 302 from the south while the second vehicle 102b may approach the same intersection 302 from the west. The current location data from the GNSS 124 from both vehicles may be transmitted to the server 186 as vehicle status. At the current location, neither vehicle is within a V2V transmission range 310a and 310b (e.g. the range supported by the DSRC transceiver 180) of each other. Different wireless connection technologies may support different transmission ranges. As an example, the DSRC transceiver 180 of the vehicles may support a transmission range of approximately 100 meters. A predicted travelling direction/route from both vehicles may be transmitted to the server 186. The predicted travelling route may be received from the navigation controller 126 of each vehicle. Alternatively, the server 186 may use one or more historic routes of each vehicle traversed in the past to determine the predicted routes. In the present example, the server 186 may predict the second vehicle 102b to travel straight passing the intersection 302 and continue to travel on eastbound of the road 306. The server 186 may further predict the first vehicle 102a to make a right turn at the intersection 302 and travel on eastbound of the road 306 after the second vehicle passed because of a red-light signal 304. After analyzing the vehicle information and predicted route, the server 186 may predict that the first vehicle 102a and the second vehicle 102b will both travel on eastbound of the road 306 within a geo-fence 308 defined by the transmission range 310 of each vehicle for a period of time. The geo-fence 308 may be defined using the V2V transmission range 310a of the first vehicle 102a as source vehicle for instance. Alternatively, the geo-fence 308 may be defined using the V2V transmission range 310b of the second vehicle 102b as a target vehicle. Further alternatively, the geo-fence 308 may be defined using the combination or overlap of the transmission ranges 310a and 310b of both vehicles 102a and 102b. The period of time that both vehicles will travel together within the geo-fence 308 may be calculated and updated in a similar manner.

As discussed above, the server 186 may further calculate the time needed to finish the data transaction using the data size and data transaction/transmission speed. For instance, the wireless transaction speed for a DSRC connection 196 may be approximately 1 Megabyte/Second. If the software file size is 30 Megabytes, about 30 seconds are needed to complete the entire transaction. The server 186 may be configured to only determine the V2V connection opportunity when the predicted travel time is long enough to complete the entire data transaction. For instance, if the first vehicle 102a and the second vehicle 102b are predicted to traverse the predicted path together within the geo-fence 308 defined by the V2V transmission range for at least 1 minute, the server 186 may coordinate and facilitate the connection by sending each vehicle a connection message instructing to connect. Alternatively, the server 186 may be configured to facilitate the connection even if the predicted time period is not long enough the complete the entire transaction. For instance, a vehicle navigation map update file may be multi-Gigabytes in size, and as such there may be difficulty in sending such a quantity of data in a single transaction. The server 186 may therefore command the sending vehicle to divide the data to be transferred into multiple block using predefined rules and identifications. As an example, one particular software file may be divided into multiple blocks, where each block is assigned a unique identifier and is created of a pre-defined sized (e.g. about 10 Megabyte). The same rules and identifications to divide files into block may be applied to any vehicle having the files. Under this configuration, the target vehicle may obtain some blocks from one source vehicle, and later obtain the remaining blocks from elsewhere.

Figure 3:
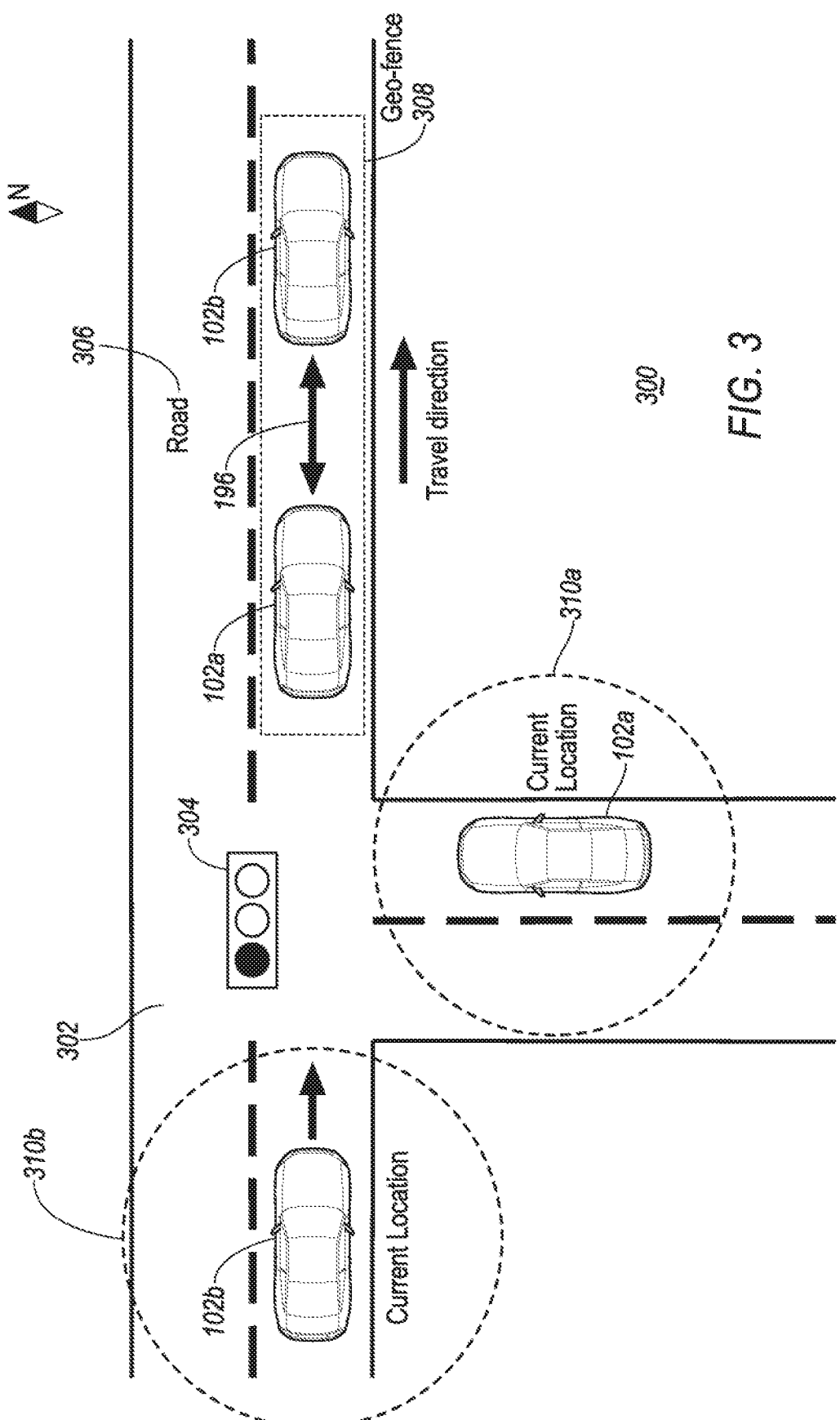
FIG. 3 illustrates an example diagram of a V2V connection system of one embodiment of the present disclosure.

Following the example illustrated with reference to FIG. 3, responsive to recognizing the connection opportunity, the server 186 generates and sends the connection message to each of the first vehicle 102a as a source vehicle and the second vehicle 102b as a target vehicle. The connection message includes information configured to inform a vehicle what information it can send/receive from another local vehicle. As both vehicles traverse the route as predicted, the vehicles may enter the geo-fence 308 as defined by the V2V transmission range and connect to each other using the information contained in the connection message. For instance, the V2V connection 196 may be established using the DSRC technology. Additionally or alternatively, other wireless technologies (e.g. Wi-Fi, NFC, Bluetooth, RFID) may also be used to establish the connection 196 and transfer data blocks depending on the relative locations of the vehicles and transmission ranges. The vehicles 102 may exchange information to verify the connection message received from the server 186 is accurate. For instance, the second vehicle 102b as a target vehicle may send the current version of the software to be updated to the first vehicle 102a via the V2V connection 196. In response, the computing platform 104 of the first vehicle 102a compares the software version received from the second vehicle 102 with its own version number, and verifies a newer version of the software is stored in the storage 106 and ready to be transferred by blocks by sending a return message to the second vehicle 102b. The first vehicle 102a may start to transfer data blocks to the second vehicle 102b and continue to transfer until all designated blocks are transferred or distance between the vehicles extends beyond the geo-fence 308.

Figure 4:
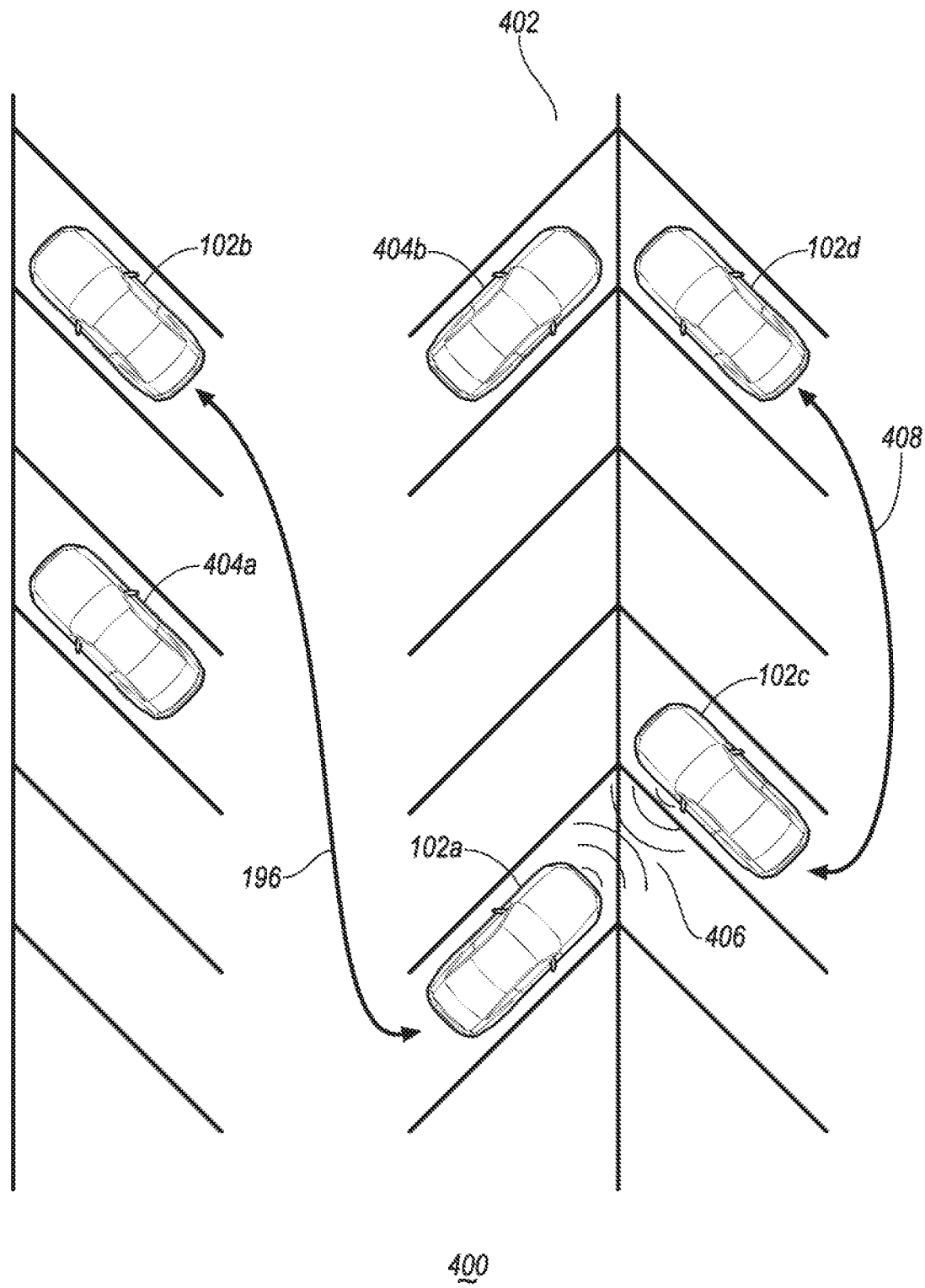
FIG. 4 illustrates an example diagram of a V2V connection system of another embodiment of the present disclosure.

Referring to FIG. 4, an example diagram 400 of the V2V connection of another embodiment of the present disclosure is illustrated. Compared with the example illustrated with reference to FIG. 3, the present example involves fleet vehicles being parked. Multiple vehicles may be parked at a parking lot 402. Among those vehicles, there may be multiple fleet vehicles including the first vehicle 102a, the second vehicle 102b, a third vehicle 102c and a fourth vehicle 102d. Other vehicles such as vehicles 404a and 404b are not among the fleet and therefore not compatible with the V2V connections.

As an example, the first vehicle 102a may have just arrived at the parking lot 402 where the other fleet vehicles have already been parked. The computing platform 104 of the first vehicle 102a may be configured to send the vehicle status to the server 186 responsive to detecting the vehicle 102a has been parked. With the location of the first vehicle 102a as compared with the locations of other fleet vehicles which are previously received, the server 186 may detect the fleet vehicles are parked closely within one or more geo-fences defined by the transmission range of vehicle transceivers. For instance, the first vehicle 102a is parked about 10 meters away from the second vehicle 102b, within a geo-fence defined by the DSRC transmission from the second vehicle 102b. Similarly, the first vehicle 102a is parked next to the third vehicle 102c (e.g. about 2 meters away), within a geo-fence defined by a Wi-Fi transmission from the third vehicle 102c.

Responsive to detecting multiple fleet vehicles parked at nearby locations, the server 186 may analyze vehicle information to detect possible connection opportunities. For instance, the first vehicle 102a may have the latest version of the ADC software 168 that the second vehicle 102b has yet to obtain, while the first vehicle 102a may obtain a newer version of map data 110 from the third vehicle 102c. The server 186 may send a connection message to each fleet vehicle 102 involved in the possible V2V connections to facilitate the data transfer. In case that one or more fleet vehicles (e.g. the second vehicle 102b) are powered off, the server 186 may first send a wakeup signal before sending the connection message. Alternatively, the wakeup signal may be combined with the connection message to send to the fleet vehicles at once.

Responsive to receiving the connection message from the server 186, a V2V connection 196 (e.g. DSRC connection) is established between the first vehicle 102a and the second vehicle 102b, wherein the first vehicle 102a may serve as a source vehicle and the second vehicle 102b may serve as a target vehicle for the ADC software 168. A second V2V connection 406 (e.g. Wi-Fi connection) between the first vehicle 102a and the third vehicle 102c may be established, wherein the first vehicle 102a may serve as a target vehicle and the third vehicle 102c may serve as a source vehicle for the map data 110. As an example, the third vehicle 102c may simultaneously connected to the fourth vehicle 102d via a V2V connection 408 for data sharing under the same principle. Responsive to a successful connection, the first vehicle 102a may start to transmit and receive data blocks from the second vehicle 102b and the third vehicle 102c respectively until the data transaction completes or being disconnected from one or more fleet vehicles.

Figure 5:
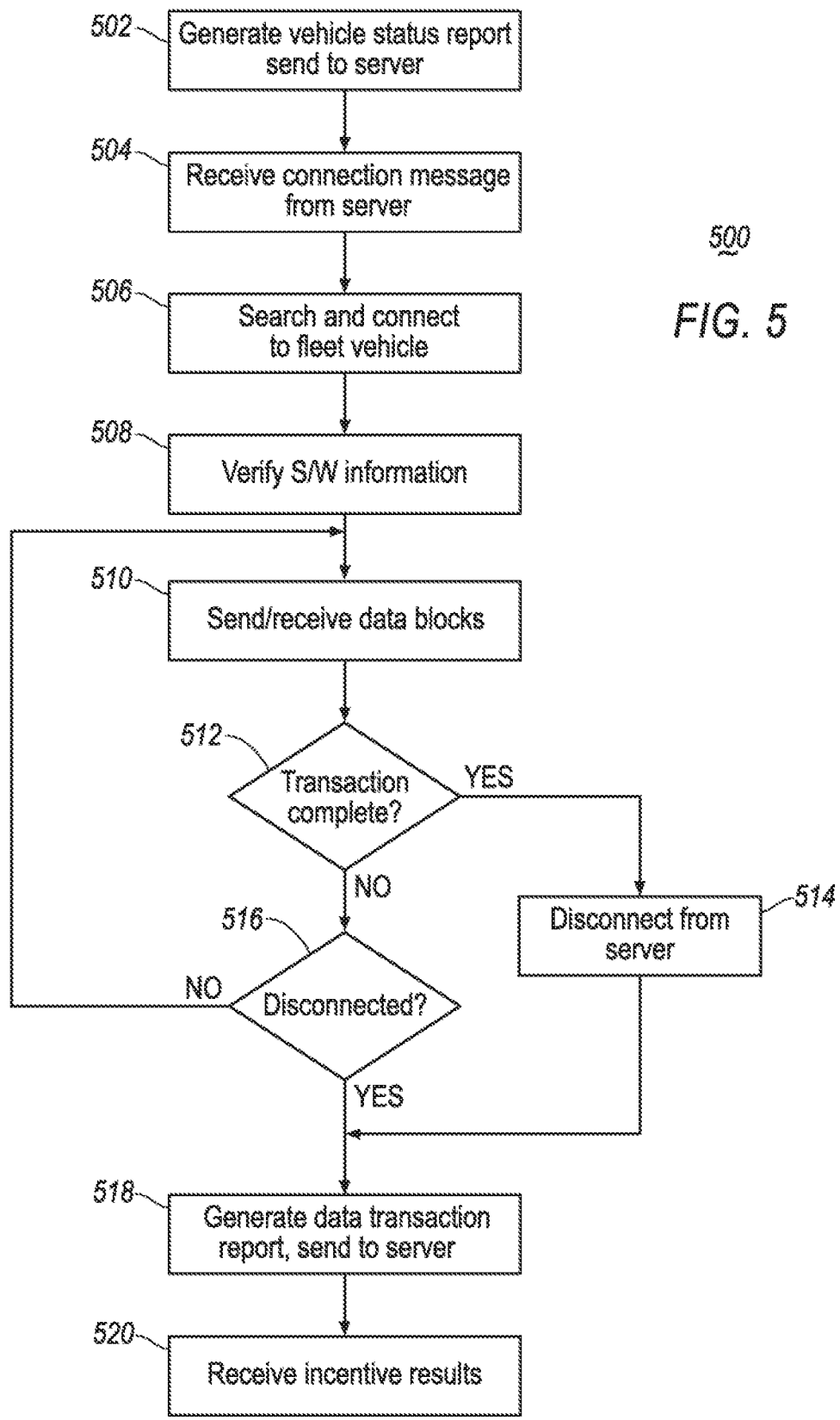
FIG. 5 illustrates an example diagram for a process of one embodiment of the present disclosure.

Referring to FIG. 5, an example diagram for a process 500 of one embodiment of the present disclosure is illustrated. In the present example, the process 500 is to be implemented on the computing platform 104 of the first vehicle 102a. At operation 502, the computing platform generates a vehicle status report using data collected from various components of the vehicle 102a and sends the vehicle status report to the server 186. The computing platform 104 may be configured to generate the vehicle status report at a pre-defined time interval (e.g. every 2 minutes). Additionally or alternatively, the computing platform 104 may be configured to generate and send the vehicle status report responsive to detecting a pre-defined event such as a vehicle being parked, entering a pre-determined geo-fence such as a dealership or the like.

At operation 504, the computing platform 104 receives a connection message from the server 186 via the TCU 174 indicative of a possible connection opportunity. The connection message may include a location/geo-fence of a fleet vehicle (e.g. the second vehicle 102b) to connect, the identification of the fleet vehicle (e.g. the DSRC identification), identification of software to be transferred or the like. The vehicle 102a does not need all blocks for a complete software to perform the V2V software sharing. For instance, if a software with large size such as the navigation map is divided into one hundred (100) blocks, and the computer platform has already obtained forty (40) blocks stored in the storage 106 from previous transactions, the computing platform 104 as a source vehicle may be configured to transfer some or all of those blocks to a target vehicle to share the data. Additionally, the computing platform 104 may be further configured to receive data blocks needed for completing software from one or more sources vehicles, this time as a target vehicle.

Using the fleet vehicle identification included in the connection message, the computing platform 104 searches from the fleet vehicle via wireless transceivers (e.g. the DSRC transceiver 180) and connect to the fleet vehicle responsive to detecting the compatible transceiver of the fleet vehicle at operation 506. At operation 508, the computing platform 104 communicates with the fleet vehicle and verifies the software information to confirm a data sharing is appropriate. For instance, the fleet vehicle status collected by the server 186 may be inaccurate (e.g. out of date), and by performing operation 508 the computing platform confirms the vehicle 102 has the data blocks to transfer to the fleet vehicle. Similarly, the computing platform 104 may also verify the fleet vehicle has data blocks that may be transferred to the vehicle 102a.

Responsive to a successful verification, at operation 510, the computing platform 104 starts the data block transaction with the fleet vehicle with the wireless connection 196. In case the first vehicle 102a is a source vehicle, the computing platform 104 transfers data blocks to the fleet vehicle. Alternatively, in case that the first vehicle 102a is a target vehicle, the computing platform 104 receives the data blocks from the fleet vehicle and store the data blocks in a storage e.g. the storage 106. In some cases, the first vehicle 102a may serve as the source vehicle and the target vehicle at the same time with the fleet vehicle.

At operation 512, the computing platform 104 detects if the scheduled data transaction with the fleet vehicle has completed. The computing platform 104 may obtain the scheduled data transaction from the connection message from the server 186 after verifying with the fleet vehicle. If the answer for operation 512 is a yes, the process proceeds to operation 514 and the computing platform 104 disconnects from the fleet vehicle. Otherwise, if the scheduled transaction is not completed yet, the process proceeds to operation 516, and the computing platform 104 detects if the connection 196 with the fleet vehicle has been lost. The vehicles may be disconnected due to various reasons such as the distance between the vehicles extends beyond the geo-fence defined by the transmission range. If the answer for operation 516 is a no, the process returns to operation 510 to continue the data transaction. Otherwise, if the computing platform 104 detects the connection 196 has been lost, the process proceeds to operation 518 and the computing platform 104 generates a data transaction report to send to the server 186. The data transaction report may include information summarizing the data transaction including the identification of blocks transferred/received, the size of data transferred/received, current status/version of the software or the like. At operation 520, the computing platform 104 receives an incentive result from the server 186 rewarding the vehicle user to use the V2V data sharing feature.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle, comprising:
 a controller including a hardware processor, programmed to,
  send a vehicle status report to a server, the vehicle status report including a vehicle location and a current software version of one or a plurality of electronic control units (ECUs);
  responsive to receiving a connection message from the server indicative of a predicted data transaction, establish a vehicle-to-vehicle connection to a first fleet vehicle using information included in the connection message, the information including a connection identification for the first fleet vehicle and a first predicted geo-fence within which the vehicle is to connect to the first fleet vehicle; and
  responsive to verifying that a second software version received from the first fleet vehicle via the vehicle-to-vehicle connection is older than the current software version, transmit a data block defined in the connection message to the first fleet vehicle, wherein the data block is associated with the current software version,
 wherein the connection message further includes connection identification for a second fleet vehicle and a second predicted geo-fence within which the vehicle is to connect to the second fleet vehicle, the second predicted geo-fence overlapping with the first predicted geo-fence, the controller is further programmed to connect to the first fleet vehicle using a first wireless connection technology within the first predicted geofence; and connect to a second fleet vehicle using a second wireless connection technology within the second predicted geofence.

2. The vehicle of claim 1, wherein the vehicle status report further includes a predicted vehicle route.

3. The vehicle of claim 1, wherein the connection message further includes a wakeup command, or an identification for the data block to transmit.

4. The vehicle of claim 1, wherein the controller is further programmed to responsive to connecting to the first fleet vehicle, verify data block information received from the first fleet vehicle against the connection message.

5. The vehicle of claim 1, wherein the controller is further programmed to responsive to disconnecting from the first fleet vehicle, generate a data transaction report summarizing the transaction with the first fleet vehicle, and send the data transaction report to the server.

6. The vehicle of claim 5, wherein the controller is further programmed to receive an incentive reward result from the server.

7. The vehicle of claim 1, wherein the controller is further programmed to connect to the first fleet vehicle using at least one of following connection technologies: dedicated short rage communications (DSRC), Wi-H, near-field communication (NFC), Bluetooth, or radio-frequency identification (RFID).

8. The vehicle of claim 1, wherein the controller is further programmed to
responsive to receiving a request for vehicle status from the server, generate the vehicle status report using data collected from an in-vehicle network.

9. The vehicle of claim 1, wherein the controller is further programmed to
dividing a software file into multiple blocks using a pre-defined rule.

10. A method for a vehicle, comprising:
responsive to receiving a request for vehicle status from a server, generating a vehicle status report using data collected from an in-vehicle network, the vehicle status report including a vehicle location, a predicted vehicle route, and a first software version;
sending the vehicle status report to a server;
responsive to receiving a connection message from the server, connecting to a first fleet vehicle using information included in the connection message, the information including a connection identification for the first fleet vehicle and a first predicted geo-fence within which the vehicle is to connect to the first fleet vehicle; and
responsive to verifying a second software version received from the fleet vehicle is newer than the first software version, receiving a data block defined in the connection message from the first fleet vehicle, wherein the data block is associated with the second software version,
wherein the connection message further includes connection identification for a second fleet vehicle and a second predicted geo-fence within which the vehicle is to connect to the second fleet vehicle, the second predicted geo-fence overlapping with the first predicted geo-fence, the method further includes
connecting to the first fleet vehicle using a first wireless connection technology within the first predicted geofence; and
connecting to a second fleet vehicle using a second wireless connection technology within the second predicted geofence.

11. The method of claim 10, further comprising:
responsive to connecting to the first fleet vehicle, verifying data block information received from the fleet vehicle against the connection message.

12. The method of claim 10, further comprising:
responsive to detecting a disconnection from the first fleet vehicle, generating a data transaction report summarizing the data transaction with the first fleet vehicle, and sending the data transaction report to the server.

13. The method of claim 12, further comprising:
receiving an incentive reward result for the data transaction with the first fleet vehicle from the server.

14. The method of claim 10, wherein the vehicle is connected to the first fleet vehicle and the second fleet vehicle using at least one of following technologies: dedicated short rage communications (DSRC), Wi-Fi, near-field communication (NFC), Bluetooth, or radio-frequency identification (RFID).

15. A server, comprising:
a controller including a hardware processor, programmed to
responsive to receiving vehicle status reports from a plurality of vehicles, analyze the vehicle status reports to detect a possible vehicle-to-vehicle (V2V) connection opportunity, each of the vehicle status reports including a vehicle location and a software version;
responsive to detecting the possible V2V connection opportunity and a first software version associated with a first vehicle and a second software version of a second vehicle are different, generate a first connection message for the first vehicle and second vehicle to establish V2V connections, the first connection message including connection identifications to establish the V2V connections, a first predicted geo-fence within which the first and second vehicles are to connect to establish the V2V connections, identifications for version of software to be transferred, and a first connection technology; and
responsive to detecting the possible V2V connection opportunity between the first vehicle and a third vehicle, generate a second connection message for the first vehicle and third vehicle, the second connection message including connection identifications to establish the V2V connections, a second predicted geo-fence within which the first and third vehicles are to connect to establish the V2V connections, and a second connection technology, wherein the first geo-fence overlaps the second geo-fence.

16. The server of claim 15, wherein the controller is further programmed to
detect the possible V2V connection opportunity using the first predicted geo-fence enclosing the first vehicle and the second vehicle.

17. The server of claim 15, wherein the controller is further programmed to
responsive to receiving a transaction report from one of the first vehicle and the second vehicle, generate an incentive reward; and
send a result of the incentive reward to at least one of the first vehicle and the second vehicle.

* * * * *